United States Patent
Lee et al.

(10) Patent No.: US 11,293,129 B2
(45) Date of Patent: Apr. 5, 2022

(54) WASHING MACHINE

(71) Applicant: LG ELECTRONICS INC., Seoul (KR)

(72) Inventors: Jeonguk Lee, Seoul (KR); Jihyun Yoon, Seoul (KR); Sechang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 16/743,348

(22) Filed: Jan. 15, 2020

(65) Prior Publication Data

US 2020/0224354 A1  Jul. 16, 2020

(51) Int. Cl.
| | |
|---|---|
| *D06F 37/30* | (2020.01) |
| *D06F 33/36* | (2020.01) |
| *D06F 33/40* | (2020.01) |
| *D06F 23/02* | (2006.01) |
| *D06F 37/40* | (2006.01) |
| *F16D 11/14* | (2006.01) |
| *D06F 105/46* | (2020.01) |

(52) U.S. Cl.
CPC ............ *D06F 37/304* (2013.01); *D06F 23/02* (2013.01); *D06F 33/36* (2020.02); *D06F 33/40* (2020.02); *D06F 37/40* (2013.01); *F16D 11/14* (2013.01); *D06F 2105/46* (2020.02)

(58) Field of Classification Search
CPC .................................................... D06F 37/304
See application file for complete search history.

(56) References Cited

FOREIGN PATENT DOCUMENTS

| CN | 105040359 | 11/2015 |
|---|---|---|
| JP | 2001-137595 | 5/2001 |
| JP | 2002-346285 | 12/2002 |
| KR | 10-2003-0012412 | 2/2003 |
| KR | 10-2003-0023316 | 3/2003 |
| KR | 10-2003-0037784 | 5/2003 |

OTHER PUBLICATIONS

Korean Notice of Allowance dated Mar. 20, 2020 issued in Application No. 10-2019-0005467.
European Search Report dated Apr. 15, 2020 issued in Application No. 20152256.2.

*Primary Examiner* — Jason Y Ko
(74) *Attorney, Agent, or Firm* — Ked & Associates, LLP (57) ABSTRACT

A washing machine of the present disclosure includes a drive shaft rotating a pulsator, a dehydration shaft connected to a washing tub, a magnetic core surround a periphery of a solenoid, an armature lifted by an attraction force between the armature and the magnetic corea lever having a support point of which a position is fixed with respect to the dehydration shaft and an operation end located at a point spaced by a predetermined distance from the support point, a clutching coupler shaft-coupling the drive shaft and the dehydration shaft to each other at a lowered position, and shaft-decoupling the drive shaft and the dehydration shaft from each other at a lifted position, an elastic member pressing the clutching coupler downward, a guide groove guiding a relative movement of the operating end with respect to the clutching coupler, and a lowering restriction section disposed in the guide groove.

7 Claims, 7 Drawing Sheets

WASHING MACHINE

CROSS-REFERENCE TO RELATED APPLICATION

This application claims priority to and the benefit of Korean Patent Application No. 10-2019-0005467, filed in the Republic of Korea on, Jan. 16, 2019, the disclosure of which is incorporated herein by reference in its entirety.

BACKGROUND OF THE INVENTION

Field of the Invention

The present disclosure relates to a washing machine including a clutch system for connecting or disconnecting a drive shaft and a dehydration shaft.

Related Art

A washing machine including a clutch which is operated by a solenoid and selectively connects (or shaft coupling) or disconnects (or shaft decoupling) a washing shaft and a dehydration shaft is well known. For example, Korean Patent Laid-Open Publication No. 2003-0023316 (hereinafter, referred to as a "related art") discloses a structure in which a slider serration-coupled to a dehydration shaft is separated from a driving portion formed in a rotor of a washing motor while being lifted by a suction force of a solenoid.

Meanwhile, in the related art, there is a problem that a current is continuously applied to the solenoid in order to maintain a state where the slider and the rotor are separated from each other.

SUMMARY OF THE INVENTION

The present disclosure provides a washing machine in which a state where a dehydration shaft rotating a washing tub is separated from (or, disconnected to) a drive shaft rotating a pulsator is maintained even when a current is not applied to the solenoid.

The present disclosure also provides a washing machine in which an operating end of a lever causing a clutching coupler to maintain a disconnection position can maintain close contact with a bottom of a guide groove provided on an inner peripheral surface of the clutching coupler.

The present disclosure also provides a washing machine in which a clutch system for connecting the drive shaft and the dehydration shaft to each other is simplified.

The present disclosure also provides a washing machine in which the number of parts of the clutch system is reduced and a separate motor used to operate the clutch system and all components associated with the motor in the related art are removed.

The present disclosure relates to a washing machine in which a drive shaft rotating a pulsator and a dehydration shaft rotating a washing tube are connected to each other or disconnected from each other by a clutch operated by a solenoid.

The washing machine includes a magnetic core configured to surround a periphery of the solenoid, an armature configured to be lifted by an attraction force between the armature and the magnetic core when a current is applied to the solenoid, and a clutching coupler configured to move integrally with the armature and to be lifted or lowered along the dehydration shaft.

The clutching coupler shaft-couples the drive shaft and the dehydration shaft to each other at a lowered position and shaft-decouples the drive shaft and the dehydration shaft from each other at a lifted position lifted from the lowered position according to the lifting of the armature. An elastic member configured to press the clutching coupler downward is provided.

A lever configured to have a support point of which a position is fixed with respect to the dehydration shaft and an operation end located at a point spaced by a predetermined distance from the support point is provided, and a guide groove configured to guide a relative movement of the operating end with respect to the clutching coupler when the clutching coupler is lifted or lowered is provided on an inner peripheral surface of the clutching coupler.

A lowering restriction section is disposed in the guide groove. When the clutching coupler is located at the lifted position, the operating end is caught by the lowering restriction section. Accordingly, the clutching coupler is not lowered and a position thereof can be maintained even when a current is not applied to the solenoid.

A predetermined point of the lever between the support point and the operating end may be pressed by an upper end of the elastic member and the operating end may press a bottom of the guide groove by a moment generated based on the support point.

The dehydration shaft may include a tubular insertion hole extending horizontally, and the lever may include a vertical portion configured to extend vertically, a support portion configured to be bent at an upper end of the vertical portion to extend horizontally in a first direction and to be inserted into the insertion hole, and an operation portion configured to extend horizontally in a second direction opposite to the first direction at a lower end of the vertical position to constitute the operating end.

The elastic member may be disposed below the support portion, and an upper end of the elastic member may press the support portion upward.

The lowering restriction section includes a locking groove configured to be formed to be open downward such that the operating end is inserted from below, and the washing machine may further include a separation guide section configured to be located in the guide groove and to guide turning of the operating end about the support point so that the operating end is separated from the locking groove when the clutching coupler is lifted. The guide groove may include a first guide section configured to guide the operating end guided by the separation guide section to a first point located above the lowering restriction section when the clutching coupler is lowered. The guide groove may further include a second guide section configured to guide the operating end located at the first point to a second point located below the locking groove when the clutching coupler is lifted and a third guide section configured to guide the operating end located at the second point to the locking groove when the clutching coupler is lifted.

DESCRIPTION OF EXEMPLARY EMBODIMENTS

Figure 1:
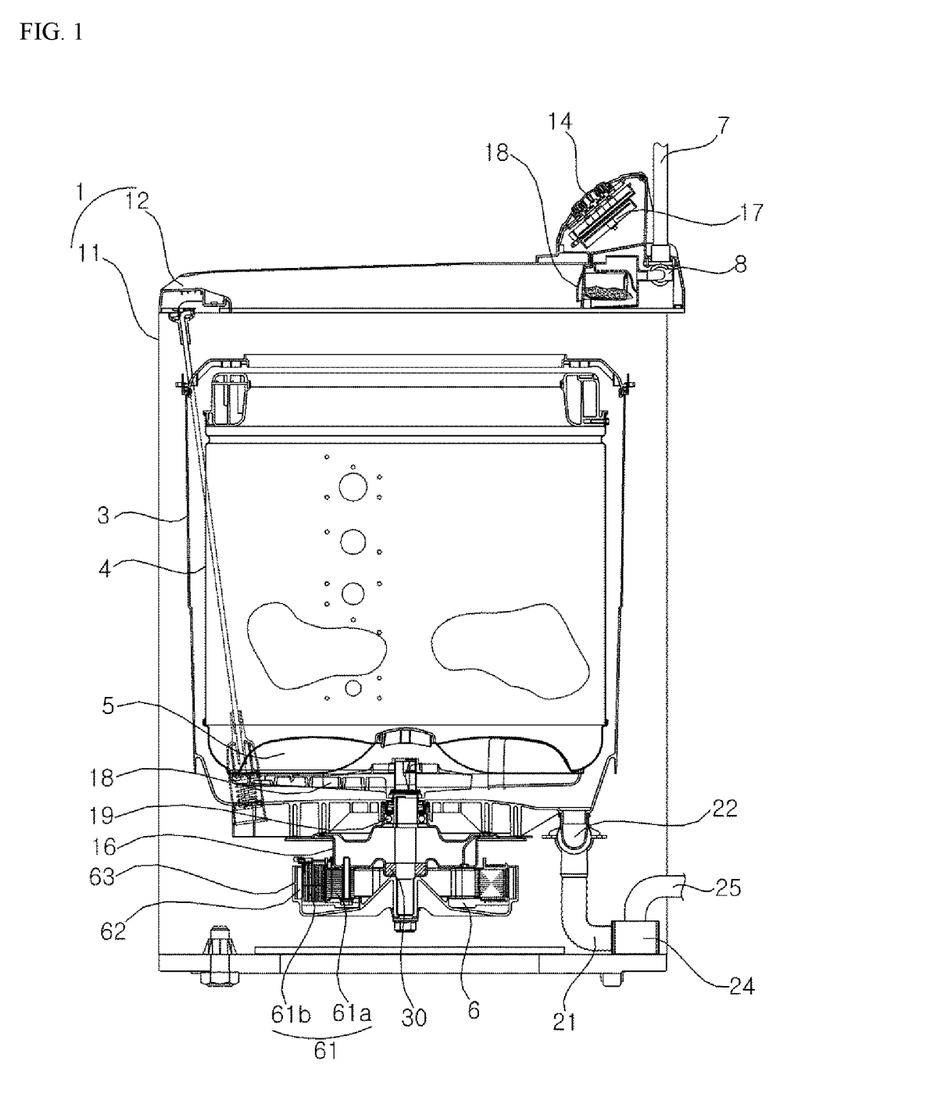
FIG. 1 is a longitudinal sectional view illustrating a washing machine according to an embodiment of the present disclosure.
Figure 2:
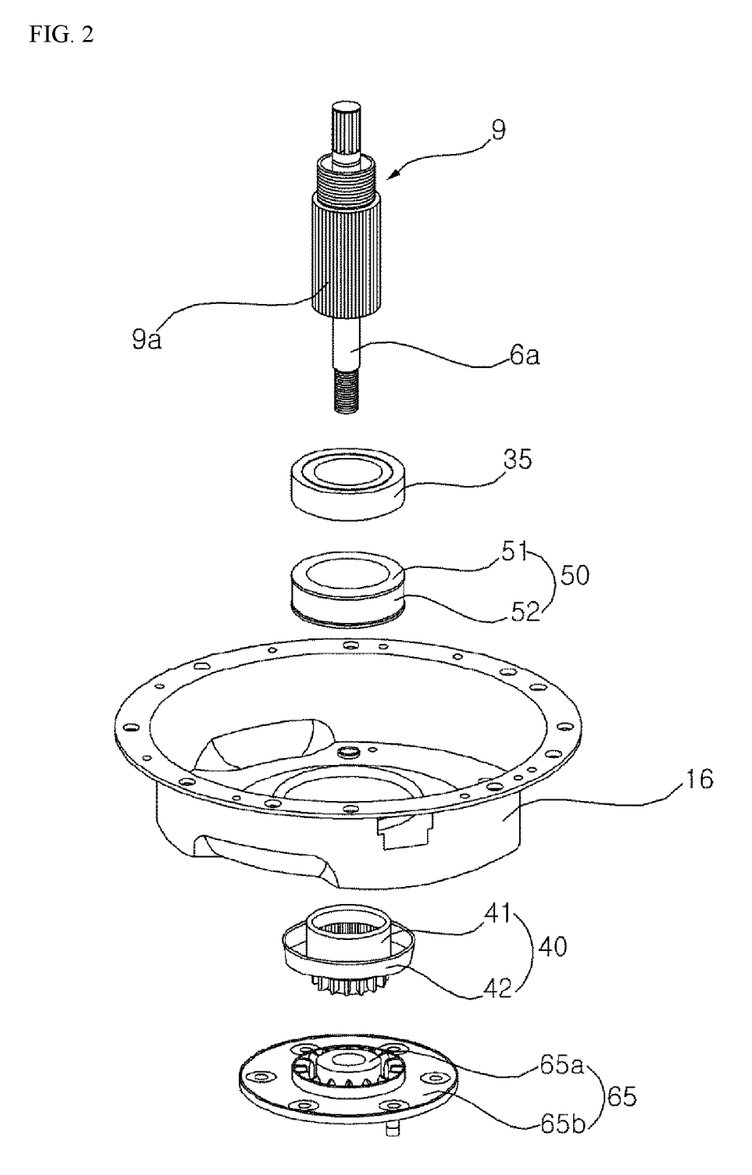
FIG. 2 is an exploded perspective view illustrating a portion of the washing machine according to the embodiment of the present disclosure.
Figure 3A:
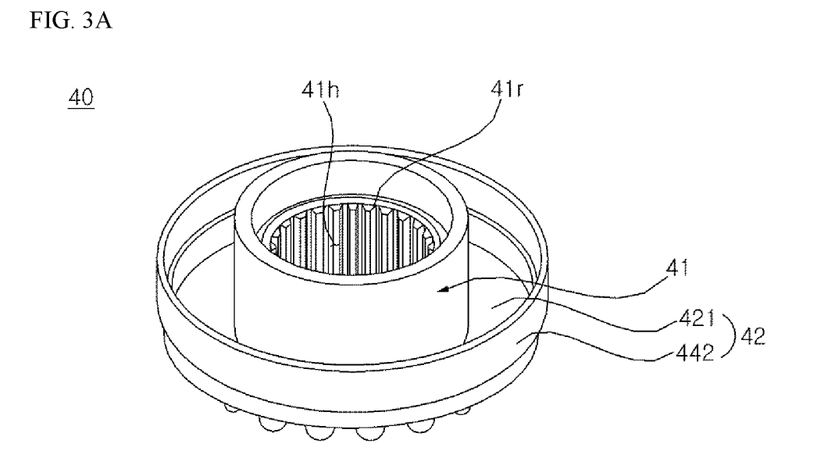
FIG. 3A is a perspective view of a clutch illustrated in FIG. 2.
Figure 3B:
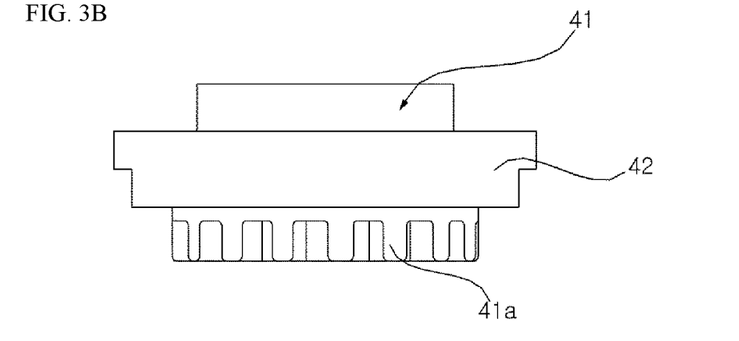
FIG. 3B is a side view thereof.
Figure 3C:
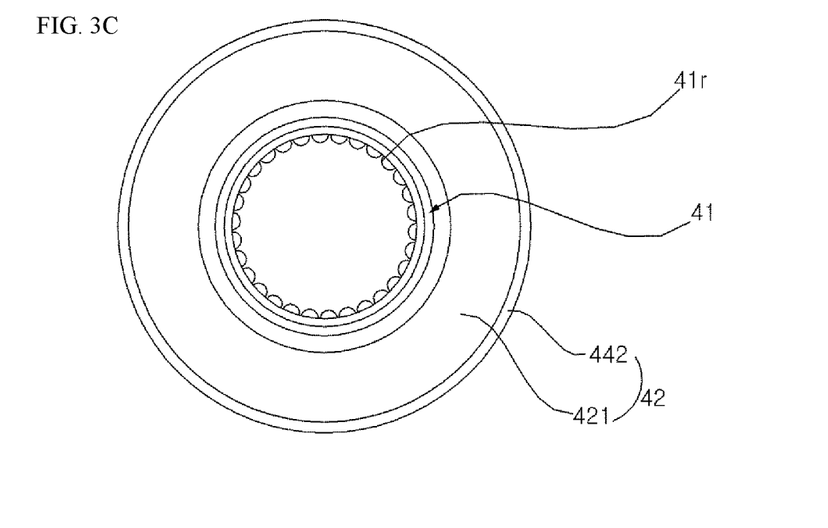
FIG. 3C is a plan view thereof.
Figure 4A:
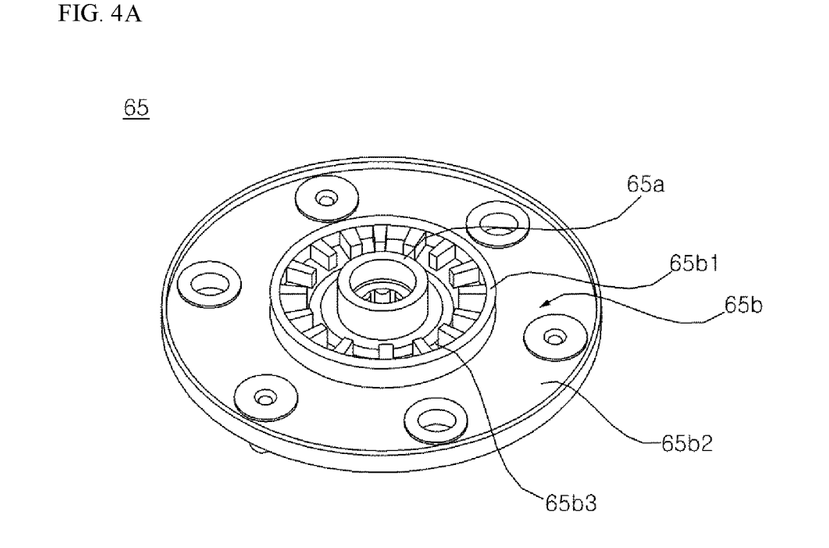
FIG. 4A is a perspective view of a rotor hub illustrated in FIG. 2.
Figure 4B:
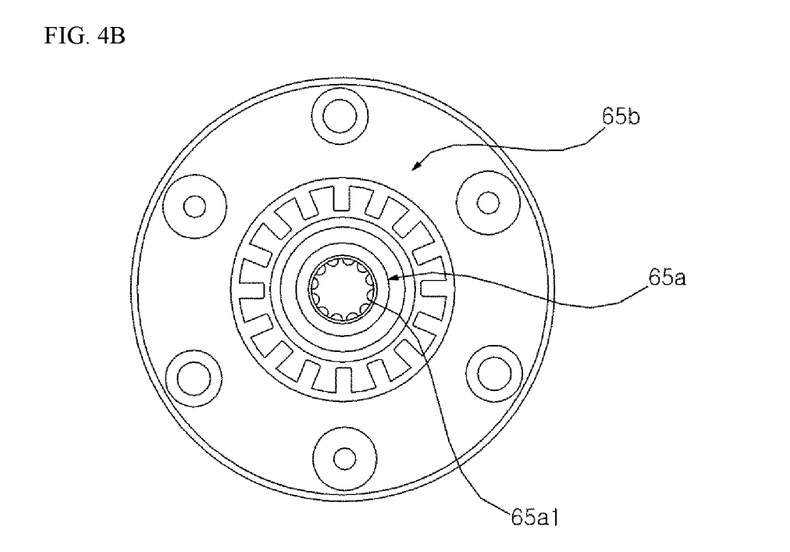
FIG. 4B is a plan view thereof.
Figure 5A:
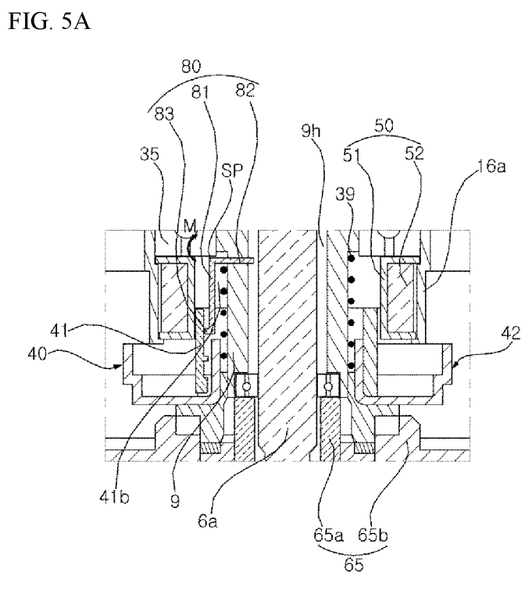
FIG. 5A is a view illustrating a state where the clutch is located at a connection position.
Figure 5B:
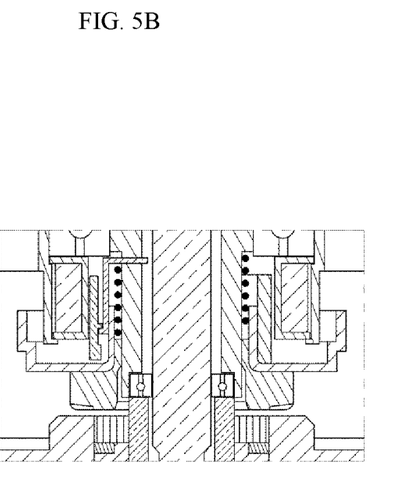
FIG. 5B is a view illustrating a state where the clutch is lifted from the connection position and is separated from the rotor hub.
Figure 6:
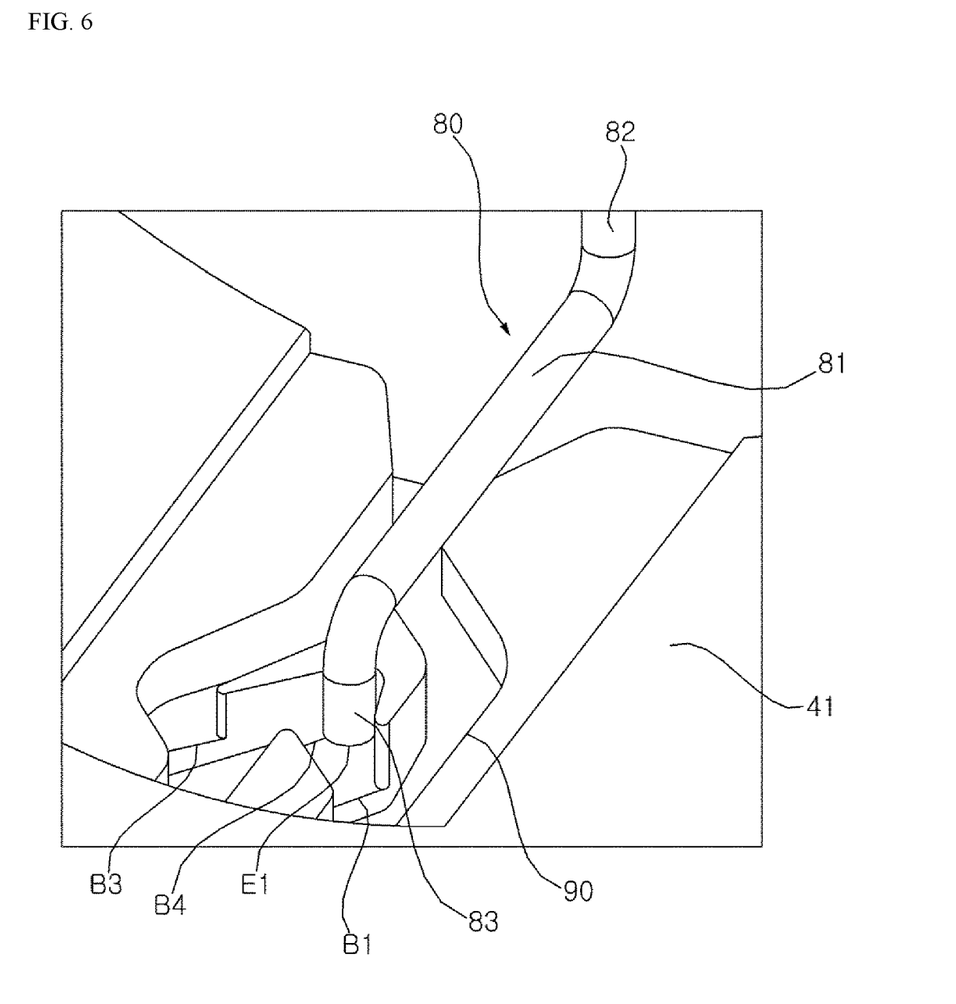
FIG. 6 is a view illustrating a guide groove and a lever.
Figure 7:
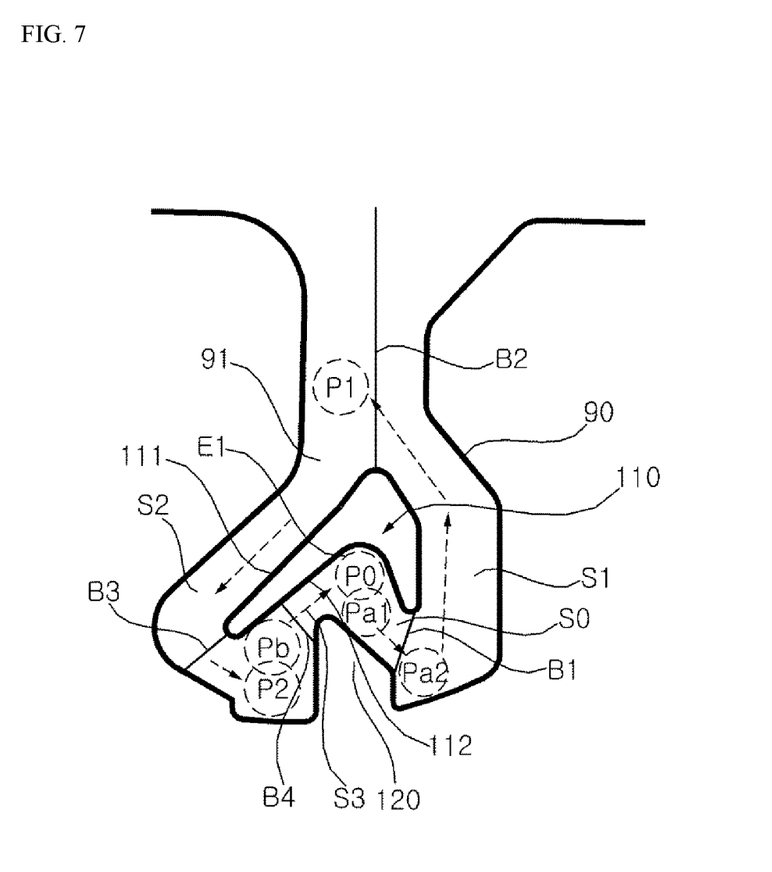
FIG. 7 is a view illustrating the guide groove.

FIG. 1 is a longitudinal sectional view illustrating a washing machine according to an embodiment of the present disclosure. FIG. 2 is an exploded perspective view illustrating a portion of the washing machine according to the embodiment of the present disclosure. FIG. 3A is a perspective view of a clutch illustrated in FIG. 2, FIG. 3B is a side view thereof, and FIG. 3C is a plan view thereof. FIG. 4A is a perspective view of a rotor hub illustrated in FIG. 2 and FIG. 4B is a plan view thereof. FIG. 5A is a view illustrating a state where the clutch is located at a connection position and FIG. 5B is a view illustrating a state where the clutch is lifted from the connection position and is separated from the rotor hub. FIG. 6 is a view illustrating a guide groove and a lever. FIG. 7 is a view illustrating the guide groove. Hereinafter, the washing machine according to the embodiment of the present disclosure will be described with reference to FIGS. 1 to 7.

Referring to FIG. 1, a casing 1 forms an outline of the washing machine, and a space in which a reservoir 3 is accommodated is formed inside the casing 1. The casing 1 may include a cabinet 11 which has an open upper surface, and a top cover 12 which is coupled to the open upper surface of the cabinet 11 and has an inlet through which laundry is introduced in a central portion thereof. A door (not illustrated) for opening or closing the inlet is rotatably coupled to the top cover 12. The top cover 12 may include a control panel 14. The control panel 14 may include an input unit (for example, a button, a dial, a touch pad, or the like) which receives various control commands for controlling an operation of the washing machine from a user, and a display unit (for example, LCD display, LED display, or the like) for visually displaying an operation state of the washing machine.

A water supply pipe 7 for guiding water supplied from an external water source such as a faucet and a water supply valve 8 for regulating the water supply pipe 7 may be provided. The water supply valve 8 may be controlled by the controller 17. The controller 17 may control the overall operation of the washing machine as well as the water supply valve 8. The controller 17 may include a microprocessor having a memory for storing data. Hereinafter, unless otherwise mentioned, it will be understood that controls of electrical/electronic components constituting the washing machine are performed by the controller 17.

A drawer 18 containing a detergent may be accommodated in the top cover 12 to be withdrawn. Water supplied through the water supply valve 8 is mixed with the detergent while passing through the drawer 18, and thereafter, is discharged into a reservoir 3 or the washing tub 4.

A discharge pipe 21 through which the water is discharged from the reservoir 3 and a drain valve 22 which controls the discharge pipe 21 may be provided. The water discharged through the discharge pipe 21 may be pumped by a drain pump 24 and discharged to the outside of the washing machine through a drain pipe 25.

The washing tub 4 accommodates the laundry and is rotated about a vertical axis in the reservoir 3. A pulsator 5 is rotatably provided in the washing tub 4. The pulsator 5 is connected to a drive shaft 6a. A plurality of holes may be formed in the washing tub 4 so that the water may flow between the reservoir 3 and the washing tub 4.

The drive shaft 6a rotates the pulsator 5, and thus, is rotated by a motor 6. The drive shaft 6a is connected to a rotor 63 of the motor 6. The drive shaft 6a may be directly connected to the pulsator 5 (that is, a rotation ratio of the drive shaft and the pulsator is 1:1). However, the present disclosure is not limited thereto, and may further include planetary gear trains which convert an output of the drive shaft 6a to a predetermined speed ratio or torque ratio to rotate the pulsator.

A dehydration shaft 9 is connected to the washing tub 4 and has a pipe shape including a first hollow 9h (refer to FIG. 5) through which the drive shaft 6a passes. A hub base 15 which is coupled to a bottom of the washing tub 4 may be provided below the washing tub 4. The dehydration shaft 9 may be coupled to the hub base 15.

A bearing housing 16 may be disposed on a lower side of the reservoir 1. The bearing housing 16 may be coupled to a bottom surface of the reservoir 1. A bearing 19 for supporting the dehydration shaft 9 may be provided in the bearing housing 16.

The bearing housing 16 is coupled to the bottom surface of the reservoir 3 by a fastening member such as a screw or bolt, and a space in which the bearing 19 is accommodated is formed between the bottom surface of the reservoir and the bearing housing 16. An opening portion through which the dehydration shaft 9 passes is formed in a bottom of the bearing housing 16.

The motor 6 may be an outer rotor type brushless direct current (BLDC) motor. However, the type of the motor 6 is not limited to this. For example, the motor 6 may be an inner rotor type motor, an AC motor such as an induction motor or a shaded pole motor, or various other known type motors.

The motor 6 may include a stator 61 in which a stator coil 61b is wound around a stator core 61a and a rotor frame 63 to which a plurality of permanent magnets circumferentially spaced from the stator 61 is fixed. A rotor hub 65 for connecting a center portion of the rotor frame 63 to the drive shaft 6a may be further provided. The rotor frame 63 is rotated by an electromagnetic force between the plurality of permanent magnets 62 and the stator 61, and thus, the drive shaft 6a is also rotated.

Meanwhile, referring to FIGS. 4A and 4B, the rotor hub 65 may include a rotor bush 65a which is coupled to the drive shaft 6a and a coupling flange 65b which couples the rotor bush 65a to the center portion of the rotor frame 63. The coupling flange 65b may include a tubular flange body portion 65b1 into which the rotor bush 65a is inserted, and a flange portion 65b2 which extends outward from the flange body portion 65b1 and is coupled to the rotor frame 63 by a fastening member such as a bolt or bolt. In particular, engagement grooves 65b3 which mesh with the clutching coupler 41 along the circumferential direction may be formed on an inner peripheral surface of the flange body portion 65b1.

A clutch 40 for shaft-coupling (or, connecting) or a shaft-decoupling (or, disconnecting) the drive shaft 6a and the dehydration shaft 9 is provided. The clutch 40 is provided to be lifted or lowered along the dehydration shaft 9 below the solenoid 50. The clutch 40 shaft-couples the drive shaft 6 and the dehydration shaft 9 at a connection position, and shaft-decouples the drive shaft 6 and the dehydration shaft 9 at a disconnection position lifted from the connection position by a suction force of the solenoid 50.

The clutch 40 is disposed below the solenoid 50 as a whole. However, an armature 42 (or a plunger) which forms a magnetic path of a flux formed by the solenoid 50 or a movable core may partially reach the inside of solenoid 50. The armature 42 may be made of ferromagnetic material. When a current is applied to the solenoid 50, the armature 42 is lifted by an attraction force between a magnetic core 16a and the armature 42.

Referring FIGS. 3A to 3C and FIGS. 5A and 5B, the clutch 40 may further include the clutching coupler 41. The clutching coupler 41 is formed in a cylindrical shape as a whole and includes a second hole 41h into which the dehydration shaft 9 is inserted. The clutching coupler 41 may be made of a synthetic resin material, but is not necessarily limited thereto, and may be made of a metal (for example, ferromagnetic material).

In the clutching coupler 41, an inner circumferential surface defining the second hollow 41h is spline-coupled to an outer circumferential surface of the dehydration shaft 9, and thus, the clutching coupler 41 may move in an axial direction (longitudinal direction of the dehydration shaft 9) in a state where a rotation of the clutch 40 with respect to the dehydration shaft 9 is restricted. The inner circumferential surface may include engagement grooves 41r which mesh with (or engage with) teeth (not illustrated) formed on the outer circumferential surface of the dehydration shaft 9.

The clutching coupler 41 shaft-couples (connects) the drive shaft 6a and the dehydration shaft 9 to each other at a lowered position corresponding to the connection position (refer to FIG. 5A) of the clutch 40, and shaft-decouples the drive shaft 6a and the dehydration shaft 9 at a lifted position corresponding to the disconnection position (refer to FIG. 5B) of the clutch 40.

Teeth 41a, which mesh with the engagement grooves 65b3 of the coupling flange 65b when the clutching coupler 41 is located at the lowered position, are formed a lower end of the clutching coupler 41.

Lifting or lowering operation of the clutch coupler 41 performed along the dehydration shaft 9 is realized by the armature 42. That is, the clutching coupler 41 is lifted by a lifting force generated from the armature 42 which is lifted by an electromagnetic interaction with the solenoid 50.

The clutching coupler 41 is coupled to the armature 42 and can be lifted integrally with the armature 42. The clutching coupler 41 and the armature 42 can be integrally formed by injecting a synthetic resin with the rotor armature 42 inserted into a mold to form the clutching coupler 41.

Referring to FIGS. 5A and 5B, an elastic member 39 which pushes the clutch 40 downward may be further provided. The lifting force acting on the clutch 40 by a magnetic field of the solenoid 50 is larger than a lowering force applied from the elastic member 39 to the clutch 40 so that the clutch 40 can be lifted when a current is applied to the solenoid 50.

The elastic member 39 may be a coil spring. The coil spring 39 may be disposed inside a bobbin 51 and may be interposed between the bearing 35 and the clutching coupler 41. An upper end of the coil spring 39 may be in contact with the bearing 35 and a lower end thereof may be in contact with the clutching coupler 41.

A magnetic core 16a surround a periphery of the solenoid 50 is provided. The magnetic core 16a forms a magnetic path through which the magnetic field generated by the solenoid 50 passes. The magnetic core 16a may be formed in the bearing housing 16.

Referring to FIGS. 3A to 3C, the armature 42 may include a core base 421 which is disposed below the magnetic core 16a and extends outward from the clutching coupler 41 and a core outer portion 442 which extends upward from an outer periphery of the core base 421. An upper end of the core outer portion 442 may be disposed radially outside the magnetic core 16a.

A lever 80 is provided in the dehydration shaft 9. The lever 80 has a support point SP of which a position is fixed with respect to the dehydration shaft 9 and an operating end E1 which is located at a point spaced by a predetermined distance from the support point SP.

The lever 80 may be formed by bending a metal wire (for example, stainless steel). A tubular insertion hole 41b extending in a horizontal direction is formed in the dehydration shaft 9, and one end of the lever 80 is inserted into the insertion hole 41b.

The lever 80 may include a vertical portion 81 which extends vertically, a support portion 82 which is bent at an upper end of the vertical portion 81 and horizontally extends in a first direction, and an operating portion 83 which horizontally extends in a second direction opposite to the first direction at a lower end of the vertical portion 81.

The support portion 82 may be inserted into the insertion hole 41b and the operating end E1 is provided on one end of the operating portion 83. The support point SP may be a point corresponding to an inlet of the insertion hole 41b on the support portion 82. The elastic member 39 may be disposed below the support portion 82.

A guide groove 90 may be provided on an inner peripheral surface of the clutching coupler 41 defining the second hole 41h. In the embodiment, the guide groove 90 is formed on the inner peripheral surface of the clutch coupler 41. However, the present invention is not limited to this. The guide groove 90 may be formed on a member separated from the clutching coupler 41 and the member may be coupled to the inner peripheral surface of the clutching coupler 41.

The guide groove 90 guides a relative movement of the operating end E1 with respect to the clutching coupler 41 when the clutching coupler 41 is lifted or lowered. The operating end E1 is located in the guide groove 90, and a position of the operating end E1 in the guide groove 90 is changed according to the lifting or lowering operation of the clutching coupler 41.

A lowering restriction section 110 may be disposed inside the guide groove 90. When the clutching coupler 41 is located at the lifted position, the operating end E1 is caught by the lowering restriction section 110. Accordingly, the clutching coupler 41 is not lowered and maintained at the lifted position.

That is, when the clutching coupler 41 is located at the lifted position, the clutching coupler 41 tries to move downward by not only a self-weight of the clutching coupler 41 but also a restoring force of the compressed elastic member 39. However, the operating end E1 is caught by the lowering restriction section 110, and thus, the clutching coupler 41 cannot be further lowered. Accordingly, even when a current is not applied to the solenoid 50, the lifted position of the clutching coupler 41 can be maintained.

The lowering restriction section 110 may protrude from a bottom of the guide groove 90. The lowering restriction section 110 may have a locking groove 112 which is formed to be open downward such that the operating end E1 is inserted from below.

A predetermined point of the lever 80 between the support point SP and the operating end E1 is pressed upward by an upper end of the elastic member 39, and in this case, the operating end E1 presses a bottom 91 of the guide groove 90 by a moment M generated based on the support point SP. Accordingly, the operating end E1 is prevented from separated from the guide groove 90.

The upper end of the elastic member 39 can press the support portion 82. A point at which the support portion 82 is pressed by the elastic member 39 is a point spaced by a predetermined distance from the support point SP.

Meanwhile, a separation guide section 120 is provided in the guide groove 90. The separation guide section 120 may protrude from the bottom 91 of the guide groove 90. When the clutching coupler 41 is lifted, the separation guide section 120 guides the operating end E1 so that the operating end E1 turns about the support point EP. The operating end E1 is separated from the locking groove 112 while being turned by the separation guide section 120.

The guide section 90 may include a first guide section S1 which guides the operating end E1 guided by the separation guide section 120 when the clutching coupler 41 is lowered. When the current applied to the solenoid 50 is cut off and the clutching coupler 41 is lowered, the operating end E1 is guided by the first guide section S1 and reaches a first point P1 located above the lowering restriction section 110. In a state where the operating end E1 is located at the first point P1, the clutching coupler 41 is maintained at the lower position by the restoring force acting downward from the elastic member 39.

The guide groove 90 may include a second guide section S2 which guides the operating end E1 from the first point P1 to a second point P2 located below the locking groove 112 when the clutching coupler 41 is lifted. When the current is applied to the solenoid 50 and the clutching coupler 41 is lifted, the operating end E1 is guided along the second guide section S2 and reaches the second point P2.

The guide groove 90 may include a third guide section S3 which guides the operating end E1 from the second point P2 to the locking groove 112 when the clutching coupler 41 is lifted. When the current is applied to the solenoid 50 and the clutching coupler 41 is lifted, the operating end E1 at the second guide section S2 is guided along the third guide section S3 and reaches the locking groove 112.

Hereinafter, an operation of a clutch system will be described with reference to FIG. 7.

When the clutch 40 is located at the disconnection position (or, lifted position), a current is not applied to the solenoid 50, and the operating end E1 is located in the locking groove 112 of the lowering restriction section 110. A position at this time is indicated by P0 in FIG. 7. In this state, the dehydration shaft 9 is separated (disconnected) from the drive shaft 6a, and only the pulsator 5 is rotated by the drive shaft 6a.

The guide groove 90 may include a lowering guide section S0 which guides the operating end E1 located in the locking groove 112 to an operating end lowered point Pa2 located below the locking groove 112 when the clutching coupler 41 is lifted.

If a current is applied to the solenoid 50, the clutching coupler 41 is lifted, the operating end E1 interferes with an upper surface of the separation guide section 120, is guided downward along an inclination of the upper surface from the position Pa1, and reaches the position Pa2. Here, the operating end E1 is moved only within a range in which the lever 80 can be turned based on the support portion 82, in actual, the clutching coupler 41 which is a counterpart is moved, and thus, the "movement" of the operating end E1 mainly is a relative movement with respect to the clutching coupler 41, which is similarly applied to the following.

The bottom 91 of the guide groove 90 is inclined to gradually descend from the position Pa1 to the position Pa2 and is stepped so that a height of the bottom 91 discontinuously decreases at a boundary B1. The position Pa2 is a point where the operating end E1 reaches after the step.

If the supply of the current to the solenoid 50 is cut off in a state where the operating end E1 reaches the position Pa2, the clutching coupler 41 is lowered by the restoring force of the elastic member 39, and the operating end E1 moves along the first guide section S1 to reach the first point P1. The first guide section S1 extends upward from the position Pa2 to the first point P1, the bottom 91 of the guide groove 90 in the first guide section S1 is inclined so that the height of the bottom 91 gradually increases from the Pa2 toward the first point P1 side and is stepped so that the height of the bottom 91 discontinuously decreases at a boundary B2. The first point P1 is a point where the operating end E1 reaches after the boundary B2.

If a current is applied to the solenoid 50 in a state where the operating end E1 reaches the first point P1, the clutching coupler 41 is lifted again, the operating end E1 comes into contact with a lowering guide surface 111 formed on the upper surface of the lowering restriction section 110 and moves downward along an inclination of the lowering guide surface 111. The operating end E1 moves downward along the second guide section S2 of the guide groove 90 and reaches the second point P2.

The second guide section S2 extends downward from the first point P1 to the position Pb side, the bottom 91 of the guide groove 90 in the second guide section S2 is inclined so that the height of the bottom 91 gradually increases from the P1 toward the position Pb side and is stepped so that the height of the bottom 91 discontinuously decreases at a boundary B3. The second point P2 is a point where the operating end E1 reaches after the boundary B3.

If the supply of the current to the solenoid 50 is cut off in a state where the operating end E1 reaches the second point P2, the clutching coupler 41 is lowered by the restoring force of the elastic member 39, and the operating end E1 moves along the third guide section S3 to enter the locking groove 91. More specifically, if the clutching coupler 41 is lowered in a state where the operating end E1 is located at the second point P2, the operating end E1 comes into contact with the lower surface of the lowering restriction section 110 at the position Pb, is guided along an upward inclination surface 112 formed on the lower surface, and enter the locking groove 91.

The third guide section S3 extends upward from the position Pb to the position P0 side, the bottom 91 of the guide groove 90 in the third guide section S3 is inclined so that the height of the bottom 91 gradually decreases from the Pb toward the position P0 side and is stepped so that the height of the bottom 91 discontinuously decreases at a boundary B4. The position P0 is a point where the operating end E1 reaches after the boundary B4.

Hereinbefore, preferred embodiments of present disclosure are illustrated and described. However, present disclosure is not limited to the specific embodiments described above, the present disclosure may be variously modified by those skilled in the art without departing from a scope of the present disclosure claimed in the claims, and the modifications should not be understood individually from a technical spirit or outlook of the present disclosure.

In the washing machine of the present disclosure, the connection or the disconnection between the drive shaft and the dehydration shaft can be maintained even when a current is not applied to the solenoid. Accordingly, it is possible to reduce power consumption.

Moreover, in the washing machine of the present disclosure, a close contact between the operating end of the lever and the bottom of the guide groove is maintained, and thus, it is possible to prevent the operating end from being separated from the guide groove.

In addition, the bottom of the guide groove and the operating end come into close contact with each other, and thus, the lever can be correctly deformed according to the height of the bottom.

Moreover, in the washing machine of the present disclosure, a separate motor used to operate the clutch system and all components associated with the motor in the related art are removed. Accordingly, a manufacturing cost of a product can be reduced.

Furthermore, air between the clutching coupler and the dehydration shaft is discharged through the guide grooves formed on the inner peripheral surface of the clutching coupler while the clutching coupler is lifted, and thus, damping effects can be obtained.

What is claimed is:

1. A washing machine comprising:
a washing tub accommodating laundry and rotatably disposed;
a pulsator rotatably disposed in the washing tub;
a drive shaft rotating the pulsator;
a dehydration shaft connected to the washing tub and having a first hollow through which the drive shaft passes;
a solenoid generating a magnetic field when a current is applied;
a magnetic core surrounding a periphery of the solenoid;
an armature lifted by an attraction force between the armature and the magnetic core when a current is applied to the solenoid;
a clutching coupler having a second hole through which the dehydration shaft passes, wherein the clutching coupler is lifted and lowered along the dehydration shaft integrally with the armature, shaft-couples the drive shaft and the dehydration shaft to each other at a lowered position, and shaft-decouples the drive shaft and the dehydration shaft from each other at a lifted position lifted from the lowered position according to the lifting of the armature;
a lever having a support point of which a position is fixed with respect to the dehydration shaft and an operation end located at a point spaced by a predetermined distance from the support point;
an elastic member pressing the clutching coupler downward;
a guide groove provided on an inner peripheral surface of the clutching coupler defining the second hole and guiding a relative movement of the operating end with respect to the clutching coupler when the clutching coupler is lifted or lowered; and
a lowering restriction section disposed in the guide groove and caught by the operating end so that the clutching coupler is not lowered in a state where the clutching coupler is located at the lifted position and a current is not applied to the solenoid.

2. The washing machine of claim 1, wherein a predetermined point of the lever between the support point and the operating end is pressed by an upper end of the elastic member and the operating end presses a bottom of the guide groove by a moment generated based on the support point.

3. The washing machine of claim 2, wherein the dehydration shaft includes a tubular insertion hole extending horizontally, and
the lever includes a vertical portion configured to extend vertically, a support portion configured to be bent at an upper end of the vertical portion to extend horizontally in a first direction and to be inserted into the insertion hole, and an operation portion configured to extend horizontally in a second direction opposite to the first direction at a lower end of the vertical position to constitute the operating end.

4. The washing machine of claim 3, wherein the elastic member is disposed below the support portion, and
an upper end of the elastic member presses the support portion upward.

5. The washing machine of claim 1, wherein the lowering restriction section includes a locking groove configured to be formed to be open downward such that the operating end is inserted from below, and
the washing machine further comprising:
a separation guide section configured to be located in the guide groove and to guide turning of the operating end about the support point so that the operating end is separated from the locking groove when the clutching coupler is lifted.

6. The washing machine of claim 5, wherein the guide groove includes a first guide section configured to guide the operating end guided by the separation guide section to a first point located above the lowering restriction section when the clutching coupler is lowered.

7. The washing machine of claim 6, wherein the guide groove further includes a second guide section configured to guide the operating end located at the first point to a second point located below the locking groove when the clutching coupler is lifted and a third guide section configured to guide the operating end located at the second point to the locking groove when the clutching coupler is lifted.

* * * * *

UNITED STATES PATENT AND TRADEMARK OFFICE
CERTIFICATE OF CORRECTION

| | |
|---|---|
| PATENT NO. | : 11,293,129 B2 |
| APPLICATION NO. | : 16/743348 |
| DATED | : April 5, 2022 |
| INVENTOR(S) | : Jeonguk Lee, Jihyun Yoon and Sechang Kim |

It is certified that error appears in the above-identified patent and that said Letters Patent is hereby corrected as shown below:

On the Title Page

Add item (30):
(30) Foreign Application Priority Data
Jan. 16, 2019 (KR)............... 10-2019-0005467

Signed and Sealed this
Tenth Day of May, 2022

Katherine Kelly Vidal
*Director of the United States Patent and Trademark Office*